(12) United States Patent
Verma et al.

(10) Patent No.: US 7,681,012 B2
(45) Date of Patent: Mar. 16, 2010

(54) METHOD, SYSTEM AND DEVICE FOR HANDLING A MEMORY MANAGEMENT FAULT IN A MULTIPLE PROCESSOR DEVICE

(75) Inventors: Atul Verma, Germantown, MD (US); Samant Kumar, Germantown, MD (US)

(73) Assignee: Texas Instruments Incorporated, Dallas, TX (US)

( * ) Notice: Subject to any disclaimer, the term of this patent is extended or adjusted under 35 U.S.C. 154(b) by 494 days.

(21) Appl. No.: 11/699,562

(22) Filed: Jan. 30, 2007

(65) Prior Publication Data
US 2008/0183931 A1    Jul. 31, 2008

(51) Int. Cl.
*G06F 13/00* (2006.01)
(52) U.S. Cl. .................. 711/207; 711/210; 711/221
(58) Field of Classification Search .............. 711/207, 711/210, 221
See application file for complete search history.

(56) References Cited

U.S. PATENT DOCUMENTS

| | | | |
|---|---|---|---|
| 5,873,124 A | 2/1999 | Draves | |
| 6,175,916 B1 | 1/2001 | Ginsberg et al. | |
| 7,398,371 B2 * | 7/2008 | Plondke et al. | 711/207 |
| 2005/0228281 A1 * | 10/2005 | Nefos | 600/446 |
| 2006/0221747 A1 | 10/2006 | Slavin et al. | |
| 2006/0294341 A1 * | 12/2006 | Plondke et al. | 711/207 |
| 2007/0094660 A1 * | 4/2007 | Codrescu | 718/100 |
| 2008/0016316 A1 * | 1/2008 | Codrescu et al. | 711/207 |
| 2008/0114972 A1 * | 5/2008 | Codrescu et al. | 712/227 |
| 2008/0115011 A1 * | 5/2008 | Codrescu et al. | 714/38 |
| 2008/0115113 A1 * | 5/2008 | Codrescu et al. | 717/127 |
| 2008/0115115 A1 * | 5/2008 | Codrescu et al. | 717/128 |
| 2008/0115145 A1 * | 5/2008 | Codrescu et al. | 719/312 |

FOREIGN PATENT DOCUMENTS

WO      WO 02/08870 A2    1/2002

* cited by examiner

*Primary Examiner*—Reba I Elmore
(74) *Attorney, Agent, or Firm*—Steven A. Shaw; W. James Brady; Frederick J. Telecky, Jr.

(57) ABSTRACT

A method or device handles memory management faults in a device having a digital signal processor ("DSP") and a microprocessor. The DSP includes a memory management unit ("DSP MMU") to manage memory access by the DSP, and the DSP and the microprocessor access shared physical memory. Upon the DSP executing an instruction attempting to access a virtual address wherein the virtual address is invalid, a page fault interrupt is generated by the DSP MMU. A microprocessor interrupt handler in the microprocessor is activated in direct response to the page fault interrupt. Thereafter in the microprocessor, a translation lookaside buffer ("TLB") entry is created in the DSP MMU, which includes a valid mapping between the virtual address and a page of physical memory. After creating the TLB entry, the microprocessor indicates to the DSP that the access by the DSP of the virtual address is completed.

20 Claims, 4 Drawing Sheets

METHOD, SYSTEM AND DEVICE FOR HANDLING A MEMORY MANAGEMENT FAULT IN A MULTIPLE PROCESSOR DEVICE

FIELD OF THE INVENTION

The present invention relates in general to virtual memory shared between multiple processors, and more specifically to handling an attempt to access an invalid virtual address in the shared memory.

BACKGROUND OF THE INVENTION

Modern day complex system-on-chip (SOC) architectures contain multiple processor cores. In one example, the architecture incorporates two processor cores—a digital signal processor (DSP) and a microprocessor—and a shared memory, in addition to other components.

To improve performance and flexibility, access by the DSP to the shared memory is mapped by a memory management unit (MMU) inside a subsystem of the DSP. The DSP MMU not only maps physical memory into the virtual address space of the DSP, but also traps any access made to an unmapped region. Access by the DSP to unmapped memory results in a fault also referred to as a page fault or a memory management fault, whereupon the DSP can stall.

Faults resulting from an invalid virtual address by the DSP can be difficult to debug. Memory management faults typically result in the DSP crashing silently, rendering it incommunicado from any external sub-system. Even with hardware debuggers, these types of faults are difficult to catch because there is no predictable place to put a breakpoint. Further exacerbating the problem is that sometimes such faults occur very infrequently and may depend upon unique conditions such as background noise.

Therefore, to address the above described problems and other problems, what is needed is for a memory management fault caused by one of the multiple processors to be handled gracefully, for example to produce useful information that can be used to narrow down or debug problematic code.

SUMMARY OF THE INVENTION

Accordingly, one or more embodiments of the present invention provide a method, and/or device, for handling memory management faults in a device having a digital signal processor ("DSP") and a microprocessor, the DSP including a memory management unit ("DSP MMU") to manage memory access by the DSP, the DSP and the microprocessor accessing shared physical memory, the microprocessor including an interrupt handler to be activated in response to a page fault interrupt. In the DSP, an instruction is executed attempting to access a virtual address wherein the virtual address is invalid, and causing a page fault interrupt to be generated by the DSP MMU. A microprocessor interrupt handler is activated in the microprocessor in direct response to the page fault interrupt. Thereafter in the microprocessor, a translation lookaside buffer ("TLB") entry is created in the DSP MMU, the TLB entry including a valid mapping between the virtual address and a page of physical memory. After creating the TLB entry, the microprocessor indicates to the DSP that the access by the DSP of the virtual address is completed, wherein the DSP processes the completion of the access of the virtual address.

The method can also include reserving the page of physical memory in the shared memory specifically for use in connection with the page fault interrupt generated by the virtual address access by the DSP. The reserving of the page of physical memory can be performed by the microprocessor. The page of physical memory can be in the address space of the microprocessor.

The creating of the TLB entry and the indicating of completion can be performed in the microprocessor by the microprocessor interrupt handler.

The microprocessor can include, after activating the microprocessor interrupt handler, indicating a DSP memory access error to the DSP. The DSP can include, upon the indicating of the DSP memory access error, performing error handling to archive selected data from the DSP.

Also, a DSP interrupt handler can be installed in the DSP to respond to a DSP mailbox interrupt. Also, the microprocessor, after creating the TLB entry, can generate the DSP mailbox interrupt. The DSP interrupt handler can, in direct response to the DSP mailbox interrupt, perform error handling to archive selected data from the DSP.

One or more embodiments can include a computer-readable medium with instructions for execution by a computer, the instructions including the computer-implemented method of handling memory management faults in a device having a DSP and a microprocessor.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE DRAWINGS

The accompanying figures, where like reference numerals refer to identical or functionally similar elements and which together with the detailed description below are incorporated in and form part of the specification, serve to further illustrate various exemplary embodiments and to explain various principles and advantages in accordance with the present invention.

DETAILED DESCRIPTION

In overview, the present disclosure concerns devices with multiple processors, typically located on an integrated circuit chip, often referred to as a system-on-chip (SOC). Such devices may share a memory, and be integrated with other technologies to provide embedded processors, communication devices, portable computing devices, and the like, and are sometimes used in connection with services such as wireless or wireline communications, voice over internet protocol (VoIP), cellular telephone services, wireless or wireline computer networks, and other services. More particularly, various inventive concepts and principles are embodied in systems, devices, and methods therein utilizing multiple processors sharing a memory.

The instant disclosure is provided to further explain in an enabling fashion the best modes of performing one or more embodiments of the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms such as first and second, and the like, if any, are used solely to distinguish one from another entity, item, or action without necessarily requiring or implying any actual such relationship or order between such entities, items or actions. It is noted that some embodiments may include a plurality of processes or steps, which can be performed in any order, unless expressly and necessarily limited to a particular order; i.e., processes or steps that are not so limited may be performed in any order.

Much of the inventive functionality and many of the inventive principles when implemented, are best supported with or in software or integrated circuits (ICs), and/or application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions or ICs with minimal experimentation. Therefore, in the interest of brevity and minimization of any risk of obscuring the principles and concepts according to the present invention, further discussion of such software and ICs, if any, will be limited to the essentials with respect to the principles and concepts used by the exemplary embodiments.

As further discussed herein below, various inventive principles and combinations thereof are advantageously employed to reduce problems caused by faults resulting from an attempt to access an invalid virtual address by a digital signal processor (DSP) in a multiprocessor system. When a page fault (also referred to herein as a memory management fault or fault) is caused by the DSP attempting to access an invalid virtual address in shared memory, the DSP can recover sufficiently to perform some further processing. For example, the DSP can collect information useful for debugging following a page fault which causes the DSP to crash. Other processing can be performed by the DSP so that the DSP can continue to perform some processing.

Further in accordance with exemplary embodiments, a multiprocessor device includes a DSP, a microprocessor, and shared physical memory. The DSP external memory can be mapped into contiguous DSP virtual address space using a memory management unit (MMU) in the DSP. The microprocessor can install a microprocessor interrupt handler to catch any interrupt generated by the DSP MMU in response to a page fault interrupt due to an invalid virtual address. Moreover, a page of physical memory can be reserved for later providing a valid translation lookaside buffer (TLB) entry mapped from the invalid virtual address. The DSP can install a DSP interrupt handler to respond to a DSP mailbox interrupt, which may be set to a higher priority interrupt.

When the DSP attempts to access an invalid virtual address, the microprocessor interrupt handler can be activated in the microprocessor. At this stage, the DSP is awaiting completion of the attempted access. The microprocessor can perform desired error handling within the microprocessor interrupt handler, such as creating a TLB entry in the DSP MMU to validly map the invalid virtual address to the reserved memory page; and generating a DSP mailbox interrupt. While the microprocessor acknowledges the interrupt and continues with its normal processing, the DSP sees that the attempted access of the invalid virtual address completed successfully, but immediately jumps to the DSP interrupt handler due to the DSP mailbox interrupt. The DSP interrupt handler can perform desired processing, such as dumping the desired debug information. For example, the dump can include context information and PC TRACE, which includes the instruction address which attempted to access the invalid virtual address. This information can be dumped to the shared memory, dumped to a display, used to generate an alarm, and/or a combination of the foregoing, or similar.

Figure 1:
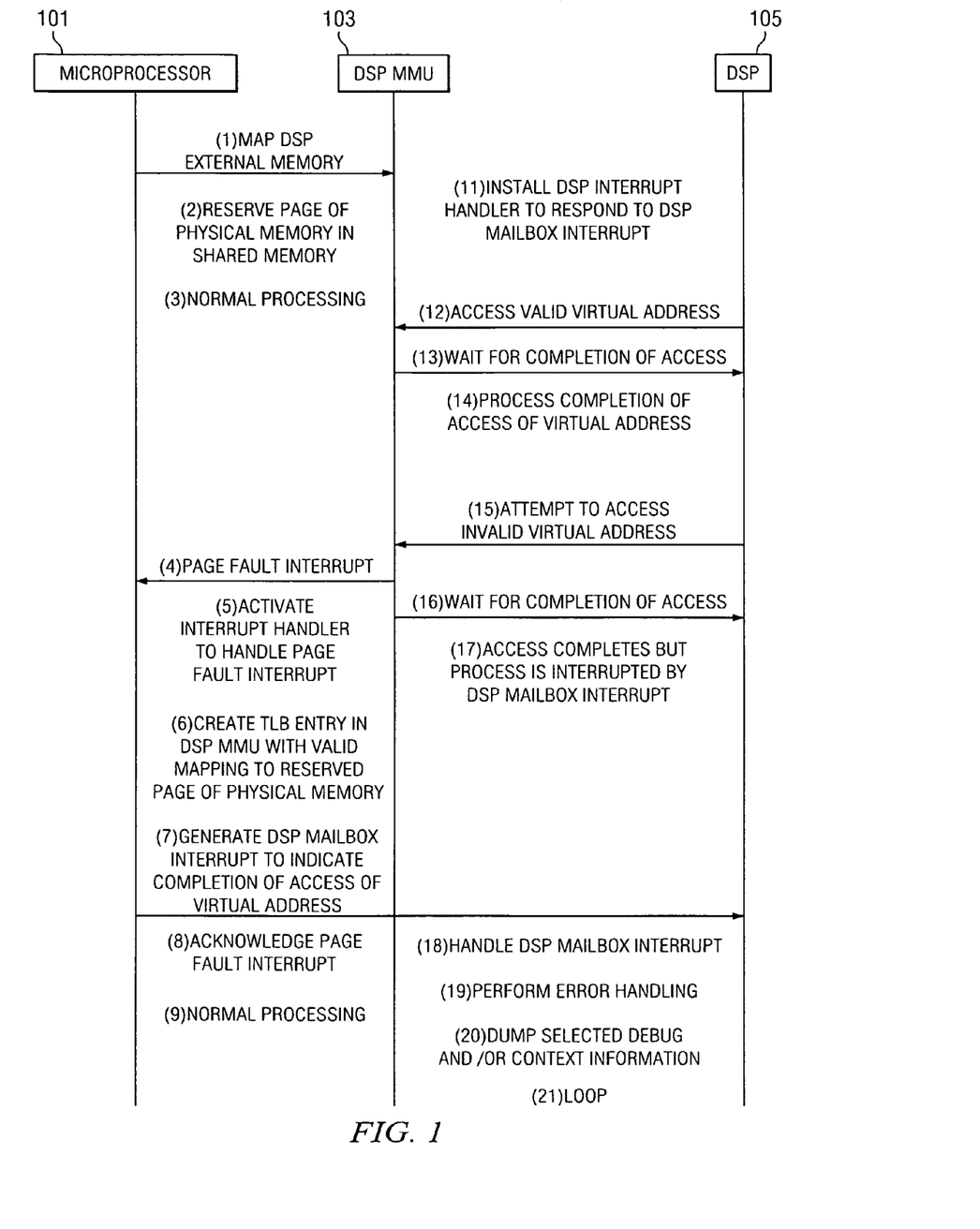
FIG. 1 is a diagram illustrating a flow of control between processors in a device with multiple processors.

Referring now to FIG. 1, a diagram illustrating a flow of control between processors in a device with multiple processors will be discussed and described. There are two processors in this example, a microprocessor 101 and a DSP 105, which are representative of any two processors in a multiple processor device. The DSP can include a MMU 103 to manage access by the DSP of physical memory shared with the microprocessor. In the illustrated multiple processor device, the microprocessor and DSP can function as master and slave, respectively, such as in connection with shared bus specifications, for example IC, or the like.

The example flow of the microprocessor 101 includes flows 1-9, and the example flow of the DSP 105 includes flows 11-21. The DSP 105 flow includes an access of a valid virtual address (flows 12-14) for comparison to an attempted access of an invalid virtual address (flows 15-17).

Initially, the microprocessor 101 prepares to reserve a page of memory for use by the DSP. Accordingly, the microprocessor 101 maps 1 the DSP external memory, for example including the shared physical memory. Then, the microprocessor 101 reserves 2 a page of the physical memory in the shared memory for use by the DSP during the fault. (Other standard processing will be well understood by those in this field and the description thereof is omitted for clarity.)

The microprocessor 101 then commences normal processing 3, which continues unless a DSP page fault interrupt is received. Handling of the page fault interrupt is described in more detail below in connection with flows 4-8. Once the page fault interrupt has been handled by the microprocessor 101, the microprocessor 101 can resume normal processing 9.

The DSP 105 flow can include an access of a valid virtual address (flows 12-14). When the DSP 105 executes a combination of instructions which access 12 a valid virtual address, the DSP 105 performs a conventional wait 13 for the completion of the access, and then continues processing 14 after completion of the access of the virtual address. Conventional techniques can be used to access the virtual address, utilizing the DSP MMU 103. For example, the virtual address can be accessed 12 through the DSP MMU 103, and the DSP MMU 103 can indicate when the access of the virtual address is complete 13, such as when the access performed by the hardware is completed.

The DSP 105 attempts an access of an invalid virtual address 15 for example by requesting an invalid virtual address from the DSP MMU. The term "invalid virtual address" is used to indicate a virtual address that does not exist for the DSP, to be distinguished from a valid virtual address with a page that needs to be fetched. As usual, the DSP 105 waits 16 for the completion of the access. The conventional completion of the access occurs 17, that is, the DSP 105 can complete the current instruction. Meanwhile, the DSP MMU issues a page fault interrupt 4 to the microprocessor 101 due to the invalid virtual address. The page fault interrupt can activate 5 the microprocessor interrupt handler to handle the page fault interrupt.

The microprocessor interrupt handler can create 6 a translation lookaside buffer (TLB) entry in the DSP MMU, so that the new TLB entry points the invalid virtual address to the reserved physical memory. Then, to wake up the DSP 105, the microprocessor interrupt handler can generate 7 a DSP mailbox interrupt which will be used to change DSP execution flow. The microprocessor interrupt handler then can acknowledge 8 the page fault interrupt and resumes 9 normal processing.

Meanwhile, the DSP 105, which is about to continue processing after completion of access of the invalid virtual address, is interrupted 17 by the DSP mailbox interrupt. More particularly, the DSP 105 can finish the instruction that was executing when the invalid virtual address was accessed, and the DSP mailbox interrupt can occur prior to execution of the instruction that follows the instruction that generated the fault. The DSP mailbox interrupt handler can be activated to handle 18 the DSP mailbox interrupt. Desired error handling 19 can be performed, for example, which can be utilized by an application level. Also, debug information and/or context information can be dumped 20, for example to memory (such as the reserved memory) or to another location, for later use in debugging the invalid virtual address. The DSP 105 can then be placed into a loop 21, for example awaiting further error handling or processing.

Figure 2:
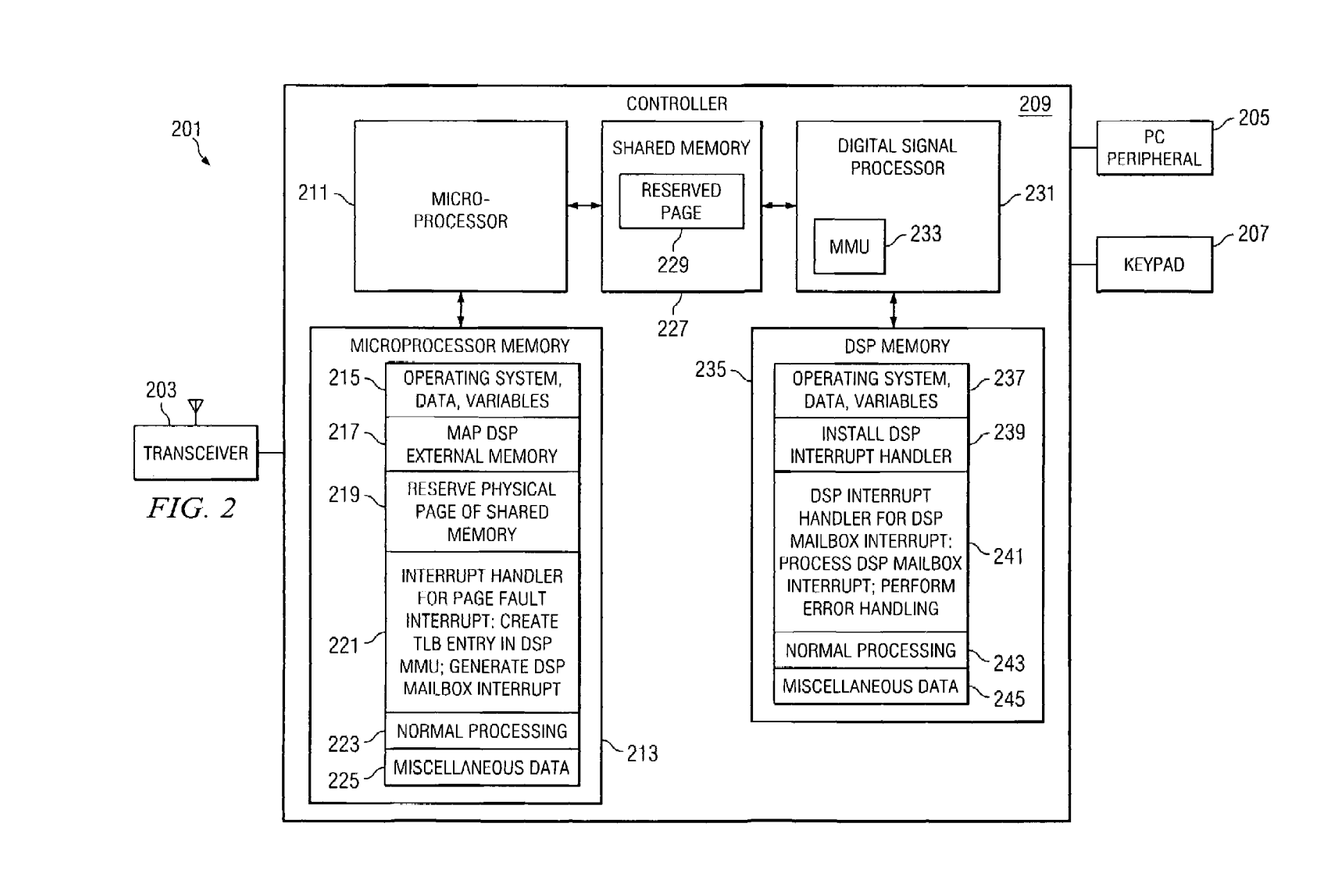
FIG. 2 is a diagram illustrating portions of a multiple processor device with a digital signal processor (DSP) and a microprocessor.

Referring now to FIG. 2, a diagram illustrating portions of a multiple processor device 201 with a microprocessor 211 and a digital signal processor (DSP) 231 will be discussed and described. The multiple processor device 201 may include optional components, here represented by a transceiver 203, a PC peripheral port for connection to a PC peripheral 205, a keypad 207, and/or other optional components such as (not illustrated) a microphone, a display, an alerting device for providing vibratory alert, visual alert, or other alert, memory devices such as a memory stick interface, communication port, a port for other peripherals such as a debugger, and/or the like. The multiple processor device 201 may include one or more controllers 209.

The controller 209 includes the microprocessor 211, the DSP 231, and a memory 227. The controller 209 may include one or more other microprocessors and/or digital signal processors (not illustrated). The memory 227 may be coupled to and accessible by both the microprocessor 211 and the DSP 231, sometimes being referred to as a "shared" memory. Furthermore, the microprocessor 211 may be coupled to a microprocessor memory 213, and the DSP 231 may be coupled to a DSP memory. The shared memory 227, the microprocessor memory 213, and the DSP memory 235 may comprise a read-only memory (ROM), a random-access memory (RAM), a programmable ROM (PROM), and/or an electrically erasable read-only memory (EEPROM).

The DSP 231 can include a memory management unit (MMU) 223 to control access of the shared memory 227 by the DSP. Thereby, the DSP 231 can view the DSP internal memory 235 and the shared external memory 227 as contiguous space, addressable in accordance with known techniques by a virtual address. The DSP MMU 223 can map a virtual address to the physical address in accordance with known techniques. Also, the DSP MMU 231 can trap any attempted access to an unmapped memory. One or more embodiments provide that separate portions of the shared memory 227 are reserved for use by either the DSP 231 or the microprocessor 213.

The microprocessor memory 213 may include multiple memory locations for storing, among other things, an operating system, data and variables 215 for programs executed by the microprocessor 211; computer programs for causing the microprocessor to operate in connection with various functions such as to map the DSP external memory 217, reserving a physical page of the shared memory 219, an interrupt handler to handle a page fault interrupt, to create a TLB entry in the DSP MMU, and to generate a DSP mailbox interrupt, and/or other normal processing 223; and a database 225 for other information used by the microprocessor 211. The computer programs may be stored, for example, in ROM or PROM and may direct the microprocessor 211 in controlling the operation of the multiple processor device 201. Appropriate operating systems for the microprocessor 211 include Linux® and other commercially available operating system programs. The computer programs of the microprocessor 213 are discussed in more detail below.

The microprocessor 211 may be programmed for various initializations prior to commencing normal runtime operations. For example, the microprocessor 211 can map the DSP external memory 217 to contiguous DSP address space at initialization, using the DSP MMU 233.

Also, the microprocessor 211 may be programmed for reserving one or more physical pages 229 of the shared memory 219 for use exclusively by the DSP 231 in connection with the memory management page fault. The reserved page 229 can be indicated as reserved so that it remains unused until needed to be mapped by the TLB entry from the invalid virtual address associated with the memory management page fault, as further described below. The reserved page 229 can be reserved at system initialization, or immediately after the memory management page fault occurs and the reserved page is needed, or at any other appropriate time prior to the memory management page fault. The reserving is performed by the microprocessor 211 because the microprocessor can include its own memory management unit that provides master control of access to the shared memory. Alternatively, the reserved page can be located in the DSP memory 235, that is, internal to the DSP and not shared; in this case the reserving can be performed by the DSP 231.

The microprocessor 211 may be programmed to include an interrupt handler 221 specific to a page fault interrupt by the DSP. The page fault interrupt can occur when the DSP 231 attempts to access an invalid virtual address through the DSP MMU 233. The DSP MMU 233 can generate a page fault interrupt which interrupts the microprocessor 211, thereby activating the microprocessor interrupt handler in direct response to the page fault interrupt.

The microprocessor interrupt handler 221 can be programmed to create the TLB entry in the DSP MMU which maps the invalid virtual address to the reserved page 229 of the shared memory 227. When the TLB is ready, the microprocessor can generate a DSP mailbox interrupt, which will interrupt the DSP 231. The DSP mailbox interrupt can cause the DSP 231 to activate interrupt processing for the DSP mailbox interrupt, typically by jumping to the interrupt handler. The microprocessor can acknowledge the page fault interrupt, and can return from the microprocessor interrupt handler 221, for example to normal processing 223.

The microprocessor 211 may be programmed for other normal processing 223, that is, to run any program in normal execution mode. The normal processing 223 can be interrupted by the microprocessor interrupt handler 221.

Now referring to the DSP memory 235, the DSP memory 235 may include multiple memory locations for storing, among other things, an operating system, data and variables 237 for programs executed by the DSP 231; computer programs for causing the DSP to operate in connection with various functions such as installing a DSP interrupt handler 239, the DSP interrupt handler for the DSP mailbox interrupt, and/or other normal processing 243; and a database 245 for other information used by the DSP 231. The computer programs may be stored, for example, in ROM or PROM and may direct the DSP 231 in coordinating operation in connection with the microprocessor 211, for example if the microprocessor 211 acts as a master and the DSP 231 acts as a slave. The computer programs of the DSP 231 are discussed in more detail below.

The DSP 231 may be programmed to installing 239 a DSP interrupt handler to respond to the DSP mailbox interrupt. The DSP mailbox interrupt may be set as a higher priority interrupt than other non-error interrupts occurring at the DSP 231. The DSP interrupt handler 239 conveniently can be installed upon system initialization of the DSP 231.

The DSP 231 can be programmed to activate the DSP interrupt handler 241 when the DSP mailbox interrupt occurs, such as by jumping to the start of the DSP interrupt handler 241. The DSP interrupt handler 241 can be programmed to handle the DSP mailbox interrupt, for example to acknowledge the DSP mailbox interrupt, as well as to perform error handling and/or to dump selected debug and/or context information. Debug and/or context information that use useful for debug includes, for example, the program counter of the DSP, registers of the DSP, selected data and variables used by the operating system 237, and the like, and may include other addresses as well. The addresses to be dumped can be indicated for example, as miscellaneous data 245. The debug and/or context information can be dumped to memory, for example the reserved page of memory, to other memory used by the DSP 231 such as internal memory, shared memory 227 allocated to the DSP 231 (if any), to an external port such as a PC peripheral 205 to a printer, display, or debugger, or the like. Optionally, the DSP 231 can be programmed to dump the selected debug and/or context information after DSP interrupt handling completes. Optionally, the DSP 231 can be programmed to manage the error in the page fault, for example by indicating an erroneous virtual address and invoking error processing (not illustrated).

The DSP 231 may be programmed for other normal processing 243, that is, for executing any program in normal execution mode. The normal processing 243 can be interrupted by the DSP interrupt handler 241.

From the above, it can be seen that an access of an invalid virtual address by the DSP 231 can result in a page fault interrupt to the microprocessor 211. The microprocessor 211 can handle the page fault interrupt while the DSP 231 is stalled; the provision of the reserved page 229 in response to the invalid virtual address requested by the DSP 231 allows the DSP 231 to avoid crashing. The microprocessor 211 can generate the DSP mailbox interrupt which interrupts the DSP 231. After the DSP 231 receives the DSP mailbox interrupt generated by the microprocessor 211, the DSP 231 can handle error processing associated with the page fault interrupt.

Figure 3:
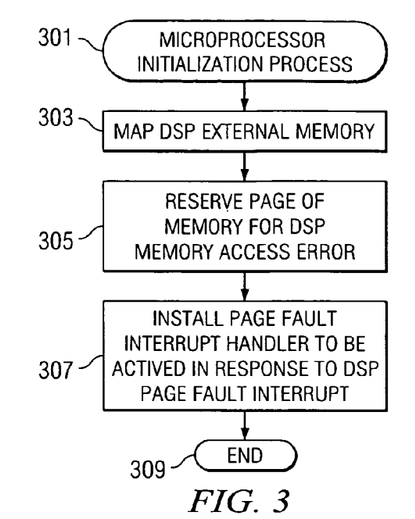
FIG. 3 is a flow chart illustrating a procedure for microprocessor initialization.
Figure 4:
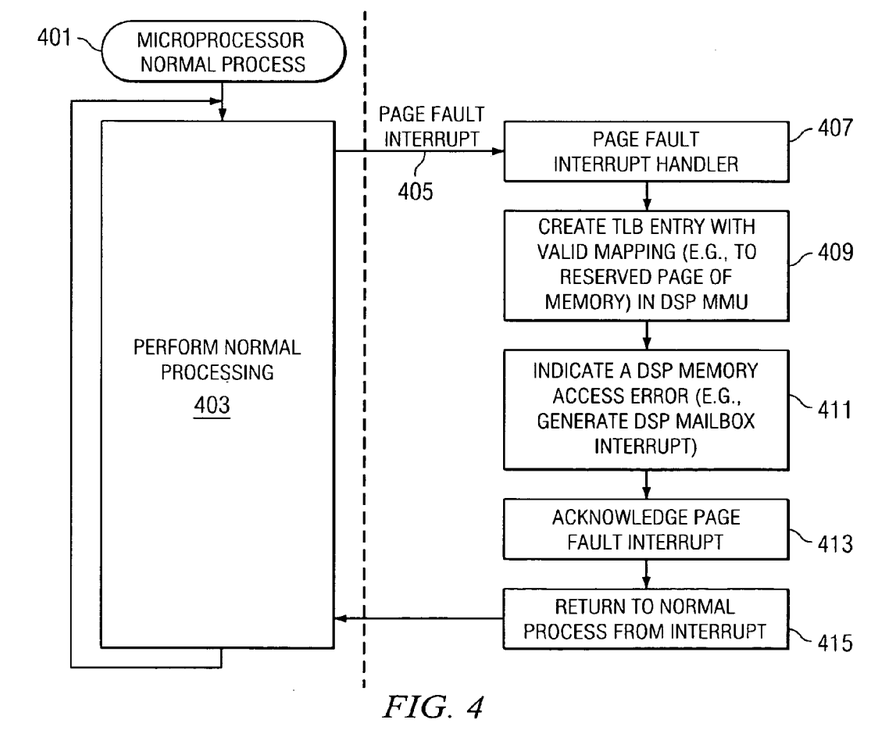
FIG. 4 is a flow chart illustrating a procedure for normal processing by the microprocessor, with page fault interrupt handler.
Figure 5:
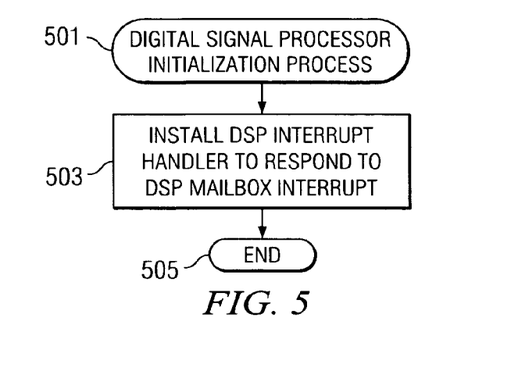
FIG. 5 is a flow chart illustrating a procedure for DSP initialization.
Figure 6:
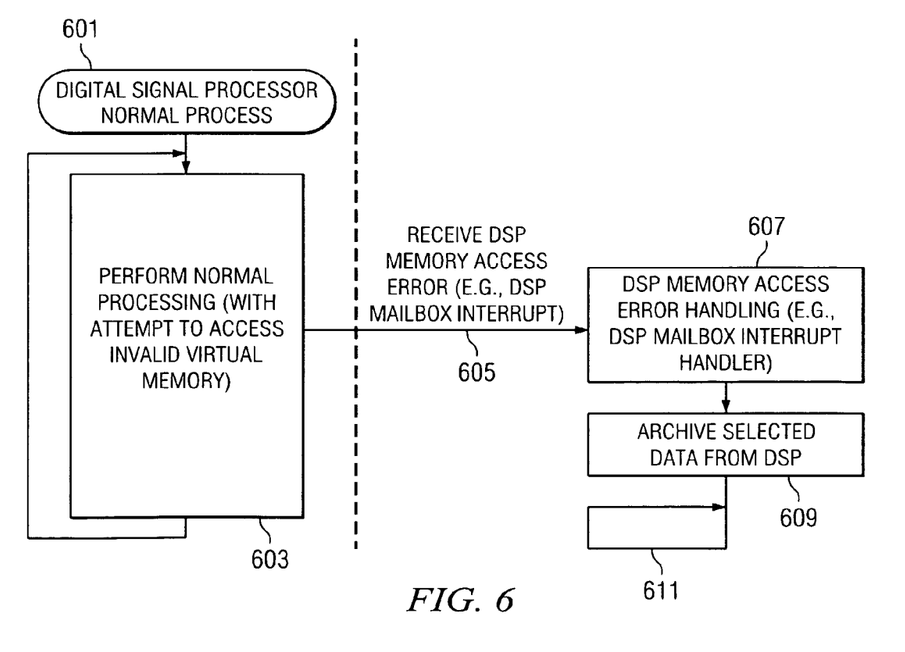
FIG. 6 is a flow chart illustrating a procedure for normal processing by the DSP, with memory access error handling.

FIG. 3 through FIG. 6 are flow charts which together illustrate the asynchronous nature of the procedures discussed above. The procedures can advantageously be implemented on, for example, two or more processors of a multiple processor device, for example the microprocessor and DSP described in connection with FIG. 2, or other apparatus appropriately arranged. FIG. 3 and FIG. 4 illustrate an initialization procedure and associated normal processing procedure, respectively implemented on a first processor such as the microprocessor. FIG. 5 and FIG. 6 illustrate an initialization procedure and associated normal processing procedure implemented on a second processor such as the DSP.

Referring now to FIG. 3, a flow chart illustrating a procedure for microprocessor initialization will be discussed and described. In overview, a microprocessor initialization process 301 can include mapping 303 DSP external memory, reserving 305 a page of memory for the DSP memory access error, and installing 307 a page fault interrupt handler to be activated in response to a DSP page fault interrupt. Each of these is discussed below, however, portions discussed in detail above may be omitted to avoid repetition.

The process 301 may include mapping 303 DSP external memory. That is, all DSP external memory, which can include non-contiguous memory in the shared memory, can be mapped so as to present a contiguous DSP virtual address space. This can advantageously be implemented in connection with an MMU such as the DSP MMU. Various techniques for mapping physical memory to virtual address space are known.

Also, the microprocessor initialization process 301 may include reserving 305 a page of memory for the DSP memory access error. That is, a page of memory accessible by the DSP can be indicated as reserved for use in connection with the DSP memory access error. The reservation of the page of memory for the DSP memory access error alternatively may be performed as late as immediately after the page fault resulting from the memory access error.

The microprocessor initialization process 301 may install 307 a page fault interrupt handler to be activated specifically in response to a DSP page fault interrupt. The microprocessor may separately install a conventional microprocessor page fault interrupt handler (not illustrated), to handle conventional page faults generated by the microprocessor accessing virtual addresses via a memory management unit in the microprocessor.

The microprocessor initialization process 301 can also include other initialization, which will be well understood by practitioners in this field. When initialization is completed, the microprocessor initialization process 301 can end 309, and for example the process 301 can commence normal processing operations.

Referring now to FIG. 4, a flow chart illustrating a procedure for normal processing 401 by the microprocessor, with page fault interrupt handler will be discussed and described. The procedure for normal processing includes performing 403 normal processing, and handling page fault interrupts 405 by transferring control to a page fault interrupt handler 407. Normal processing 403 continues until an interrupt occurs.

The page fault interrupt handler can be activated by a page fault interrupt, which is caused by the DSP MMU being requested by the DSP to access an invalid virtual address. The page fault interrupt handler 407 can include creating 409 a TLB entry so that the invalid virtual address has a valid mapping to a reserved page of memory. If the page of memory was not previously reserved, the page fault interrupt handler 407 can also include reserving the page of physical memory.

The page fault interrupt handler 407 can also indicate 411 a DSP memory access error to change the normal execution flow of the DSP. As illustrated here, the DSP memory access error is indicated 411 by generating a DSP mailbox interrupt.

The DSP mailbox interrupt can be a unique interrupt to specifically change the flow of control, for example so that debug information can be dumped.

The page fault interrupt handler 407 can acknowledge 413 the page fault interrupt, and/or can perform other standard processing to prepare for exiting from the interrupt. Then, the page fault interrupt handler 407 can exit so as to return 415 to normal processing 403.

Referring now to FIG. 5, a flow chart illustrating a procedure for digital signal processor (DSP) initialization will be discussed and described. The DSP initialization process 501 can include installing 503 a DSP interrupt handler to be activated specifically in response to a DSP mailbox interrupt. The DSP initialization process 501 can also include other initialization, which is not discussed herein because it will be well understood by practitioners in this field. When initialization is completed, the DSP initialization process 501 can end 505, and for example the process 501 can commence normal processing operations.

Referring now to FIG. 6, a flow chart illustrating a procedure for normal processing by the DSP, with memory access error handling will be discussed and described. The procedure for DSP normal processing 601 can include performing 603 normal processing. In at least one instance, the normal processing 603 includes an attempt to access an invalid virtual address. For example, the normal processing 603 may include an instruction to access an address which is random, non-initialized, improperly calculated, or similar.

The result of attempting to access an invalid virtual address is that a DSP memory access error 605 is received. The DSP memory access error 605 can be received as a DSP mailbox interrupt or a special purpose flag or signal, for example.

Upon receipt of the DSP memory access error, DSP memory access error handling 607 is initiated. If the DSP memory access error is implemented as a DSP mailbox interrupt, the DSP mailbox interrupt can be received and the DSP interrupt handler can be activated automatically, for example by appropriately loading the program counter as is conventionally done when an interrupt occurs. If the DSP memory access error is implemented as a special purpose flag or signal, then the memory access error handling process can be commenced for example by calling a subroutine or similar.

Then, appropriate action can be taken in response to the DSP memory access error. For example, as illustrated, selected data in the DSP can be archived 609 (also referred to herein as "dumped"). When the archive is completed, the process can loop 611 or otherwise await further action.

It should be noted that the term multiple processor device may be used interchangeably with multiprocessor device, multi-core processor or the like. Each of these terms denotes a device having two or more independent processors combined into a single physical package, for example as a single integrated circuit (IC), sometimes referred to as a system-on-chip (SOC), and equivalents thereof. A typical multiple processor device allows the multiple processors to execute independently in parallel. The two or more independent processors can have a different memory map, a different peripheral set, different executable instructions, different operating systems, and/or a different instruction set. An appropriate multiple processor device includes the OMAP® device available from Texas Instruments Incorporated, for example, model 161x, 171x, 73x, extensions and enhancements thereof.

This disclosure is intended to explain how to fashion and use various embodiments in accordance with the invention rather than to limit the true, intended, and fair scope and spirit thereof. The invention is defined solely by the appended claims, as they may be amended during the pendency of this application for patent, and all equivalents thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A method of handling memory management faults in a device having a digital signal processor ("DSP") and a microprocessor, the DSP including a memory management unit ("DSP MMU") to manage memory access by the DSP, the DSP and the microprocessor accessing shared physical memory, the microprocessor including an interrupt handler to be activated in response to a page fault interrupt, comprising:
(A) in the DSP, executing an instruction attempting to access a virtual address wherein the virtual address is invalid, and causing a page fault interrupt to be generated by the DSP MMU;
(B) activating a microprocessor interrupt handler in the microprocessor in direct response to the page fault interrupt, and thereafter in the microprocessor:
(1) creating a translation lookaside buffer ("TLB") entry in the DSP MMU, the TLB entry including a valid mapping between the virtual address and a page of physical memory;
(2) after creating the TLB entry, indicating to the DSP that the access by the DSP of the virtual address is completed, wherein the DSP processes the completion of the access of the virtual address.

2. The method of claim 1, wherein the page of physical memory is in the address space of the microprocessor.

3. The method of claim 1, further comprising:
reserving the page of physical memory in the shared memory specifically for use in connection with the page fault interrupt generated by the virtual address access by the DSP.

4. The method of claim 3, wherein the reserving is performed by the microprocessor.

5. The method of claim 1, wherein the creating of the TLB entry and the indicating of completion are performed in the microprocessor by the microprocessor interrupt handler.

6. The method of claim 1, further comprising,
in the microprocessor, after activating the microprocessor interrupt handler, indicating a DSP memory access error to the DSP; and
in the DSP, upon the indicating of the DSP memory access error, performing error handling to archive selected data from the DSP.

7. The method of claim 1, further comprising:
installing a DSP interrupt handler in the DSP to respond to a DSP mailbox interrupt;
in the microprocessor, after creating the TLB entry, generating the DSP mailbox interrupt; and
in the DSP interrupt handler, in direct response to the DSP mailbox interrupt, performing error handling to archive selected data from the DSP.

8. A multiple processor device having a digital signal processor ("DSP") and a microprocessor, the DSP including a memory management unit ("DSP MMU") to manage memory access by the DSP, the DSP and the microprocessor accessing shared physical memory, the microprocessor including an interrupt handler to be activated in response to a page fault interrupt, comprising:
- (A) a DSP, the DSP being configured to facilitate (1) executing an instruction attempting to access a virtual address, and (2) if the virtual address is invalid, causing a page fault interrupt to be generated by the DSP MMU;
- (B) a microprocessor, the microprocessor being configured to facilitate activating a microprocessor interrupt handler in the microprocessor in direct response to the page fault interrupt, and thereafter in the microprocessor:
  - (1) creating a translation lookaside buffer ("TLB") entry in the DSP MMU, the TLB entry including a valid mapping between the virtual address and a page of physical memory;
  - (2) after creating the TLB entry, indicating to the DSP that the access by the DSP of the virtual address is completed, wherein the DSP processes the completion of the access of the virtual address.

9. The device of claim 8, wherein the page of physical memory is in the address space of the microprocessor.

10. The device of claim 8, wherein the page of physical memory in the shared memory is reserved specifically for use in connection with the page fault interrupt generated by the virtual address access by the DSP.

11. The device of claim 10, wherein the microprocessor is configured to facilitate the reserving.

12. The device of claim 8, wherein the microprocessor interrupt handler is configured for the creating of the TLB entry and the indicating of completion.

13. The device of claim 8,
- wherein the microprocessor is further configured, after activating the microprocessor interrupt handler, to indicate a DSP memory access error to the DSP; and
- wherein the DSP is further configured, upon the indicating of the DSP memory access error, to perform error handling to archive selected data from the DSP.

14. The device of claim 8,
- wherein the microprocessor is further configured, after creating the TLB entry, to generate the DSP mailbox interrupt; and
- wherein in the DSP interrupt handler is further configured, in direct response to the DSP mailbox interrupt, to perform error handling to archive selected data from the DSP.

15. A computer-readable medium comprising instructions for execution by a computer, the instructions including a computer-implemented method of handling memory management faults in a device having a digital signal processor ("DSP") and a microprocessor, the DSP including a memory management unit ("DSP MMU") to manage memory access by the DSP, the DSP and the microprocessor accessing shared physical memory, the microprocessor including an interrupt handler to be activated in response to a page fault interrupt, the instructions for implementing:
- (A) in the DSP, executing an instruction attempting to access a virtual address wherein the virtual address is invalid, and causing a page fault interrupt to be generated by the DSP MMU;
- (B) activating a microprocessor interrupt handler in the microprocessor in direct response to the page fault interrupt, and thereafter in the microprocessor:
  - (1) creating a translation lookaside buffer ("TLB") entry in the DSP MMU, the TLB entry including a valid mapping between the virtual address and a page of physical memory;
  - (2) after creating the TLB entry, indicating to the DSP that the access by the DSP of the virtual address is completed, wherein the DSP processes the completion of the access of the virtual address.

16. The computer-readable medium of claim 15, wherein the page of physical memory is in the address space of the microprocessor.

17. The computer-readable medium of claim 15, the instructions further implementing:
- reserving the page of physical memory in the shared memory specifically for use in connection with the page fault interrupt generated by the virtual address access by the DSP,
- wherein the reserving is performed by the microprocessor.

18. The computer-readable medium of claim 15, wherein the creating of the TLB entry and the indicating of completion are performed in the microprocessor by the microprocessor interrupt handler.

19. The computer-readable medium of claim 15, the instructions further implementing,
- in the microprocessor, after activating the microprocessor interrupt handler, indicating a DSP memory access error to the DSP; and
- in the DSP, upon the indicating of the DSP memory access error, performing error handling to archive selected data from the DSP.

20. The computer-readable medium of claim 15, the instructions further implementing:
- installing a DSP interrupt handler in the DSP to respond to a DSP mailbox interrupt;
- in the microprocessor, after creating the TLB entry, generating the DSP mailbox interrupt; and
- in the DSP interrupt handler, in direct response to the DSP mailbox interrupt, performing error handling to archive selected data from the DSP.

* * * * *